Patented June 15, 1948

2,443,451

UNITED STATES PATENT OFFICE 2,443,451

PROCESS OF PREPARING ESTERS

William E. Grigsby, Wilmington, Del., assignor to E. I. du Pont de Nemours & Company, Wilmington, Del., a corporation of Delaware No Drawing. Application September 12, 1946, Serial No. 696,613

4 Claims. (Cl. 260—344)

This invention relates to a process for the preparation of aliphatic organic esters and more particularly to the preparation of esters from cyclic ethers.

An object of the present invention is to provide a process whereby cyclic ethers are combined with ketenes to form cyclic esters. Another object is to provide a process for producing cyclic esters having the formula

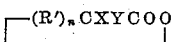

(in which R' is an aliphatic divalent radical and X and Y are hydrogen or alkyl radicals) from cyclic ethers and ketenes. A further object is to provide an efficient and economical process for the preparation of epsilon-caprolactone from ketene and tetramethylene oxide. Other objects and advantages of the invention will hereinafter appear.

The above and other objects are realized by passing ketene into a cyclic ether, preferably acidified, and conducting the reaction until no more ketene is absorbed. The reaction generally takes place spontaneously in the presence of an acid catalyst and without the necessity of heating. Cooling means may be used to withdraw the heat of the reaction and maintain the reaction temperature within the desired range. The reaction may be carried out by preparing an acidified mixture of the ether to be reacted and bubbling ketene into the mixture in the substantial absence of water.

Generically the reaction may be illustrated by the equation:

(1) 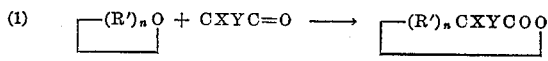

wherein R' is a divalent radical such as ethylene, trimethylene, tetramethylene, pentamethylene, and the like or similar substituted diradicals, and the X and Y may be hydrogen or an alkyl group. In Equation 1 cyclic alkylene oxides are reacted with ketene to form lactones. A specific embodiment of the invention is illustrated by the equation:

(2) 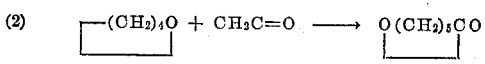

whereby Equation 2 illustrates the addition of ketene to tetrahydrofurane to form epsilon-caprolactone.

The reaction is preferably conducted at relatively low temperatures, generally below 100° C. ranging down to about −80° C. with a preferred operating range between −10 and 80° C. The reaction is ordinarily effected at atmospheric pressure, although subatmospheric or superatmospheric pressures may be employed, if desired. The ketene as a vapor may be passed into a mixture of ether and catalyst either by bubbling, diffusion or by any other suitable means of intimate contact of the vapor with the liquid. Solvents may be employed, although the reaction can be conducted in their absence, organic solvents being preferred that are inert to the reactants but which dissolve both the reactants and products.

The catalyst used for conducting the reaction may be any suitable acid catalyst such as sulfuric acid, phosphoric acid, benzene sulfonic acid, zinc chloride, ferric chloride, aluminum chloride, boron trifluoride and its addition products with ethers, esters, ketene and the like, Friedel-Crafts type catalysts or combinations of these catalysts. The catalyst should be present in amounts ranging from approximately 0.2 to 100%, based on the weight of ether, the proportion of catalyst depending primarily on its activity and the temperature employed. While the reaction will proceed satisfactorily in some instances in the absence of a catalyst, catalysts are preferably used.

The ketenes that may be used include aldoketenes having the formula RCH : CO, in which R is hydrogen or alkyl and the keto-ketenes having the formula $R_2C$ : CO, in which R is an alkyl group such as methyl, ethyl or propyl or an aryl group such as phenyl or tolyl.

The ethers that may be employed (and this term is used in its strict sense, which does not include acetals, formals or ortho-esters) are the saturated aliphatic cyclic ethers: ethylene oxide, 1,2-propylene oxide, 1,3-propylene oxide, and such ethers as dioxane, polymethylene oxides, and the like.

Although the esters form rapidly upon the introduction of the ketene into the cyclic ether and the reaction may be of any desired duration, it is usually terminated when the reaction has proceeded to that stage at which substantially no more ketene is absorbed; the catalyst is then neutralized by the addition of a suitable alkali such as an alkali metal alkoxide or an alkaline earth metal alkoxide, as sodium methoxide or sodium bicarbonate, sodium carbonate and the like, or anhydrous ammonia, any precipitate is then filtered off and the ester recovered by fractional distillation.

The examples illustrate preferred embodiments of the invention.

*Example 1.*—Ketene gas (about 0.6 mol.) was passed during three hours through a stirred mixture of 39.0 g. tetrahydrofuran,

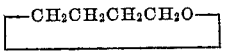

and 0.5 g. boron fluoride (dissolved at 0° C.) at 0° C. The liquid mixture increased in weight by 4.3 g. during processing. Sodium methylate (0.4 g.) in methanol equivalent to the $BF_3$ charged was added with cooling. The mixture was still acidic so several times this much sodium methylate was added. Finally, the addition of alkali was stopped while the mixture was still acidic. The low boilers were rapidly distilled at low pressure and then an epsilon-caprolactone fraction was distilled at about 68°/2.5 mm. This fraction weighed 3.1 g. and had a saponification number of 468 (theoretical 492).

*Example 2.*—Ketene gas (about 0.4 mol.) was passed during 1.4 hours through a stirred solution of 176.3 g. tetrahydrofuran and 5.0 cc. sulfuric acid. The mixture was not cooled. The temperature was 21–34° during the first 35 minutes, at the end of which time the reaction mixture was colorless. At the end of 1.4 hours the temperature had risen to above 65° and the mixture was black. The weight gain of the solution was 8.5 g. Almost twice the theoretical quantity of methanolic sodium methylate was added, but the mixture still tested acidic to wet litmus. It was filtered and distilled at reduced pressure. A total of 8.3 g. (18.2% conversion, based on ketene) of epsilon-caprolactone was obtained.

The examples illustrate discontinuous, in contrast to continuous, types of operation. The characteristics of the reactants, however, lend themselves well to continuous operation, whereby the ketene vapor and the liquid ether are introduced at controlled rates into a tubular reaction zone, the temperature of which is controlled by means of a cooling jacket. When so operating a solid acid catalyst may be used, supported or not, and the fluid reactants passed over or through it. The products issuing from the exit end of the zone are continuously neutralized, filtered, and distilled for the recovery of the esters.

The cyclic esters of the invention are valuable solvents and plasticizers for use in plastic and allied arts and may be used as intermediates for the preparation of other organic compounds.

I claim:

1. A process for the preparation of epsilon-caprolactone which comprises making a mixture of tetrahydrofuran and an acidic condensation catalyst, introducing ketene into the resulting mixture at a temperature below 100° C. until substantially no more ketene is absorbed, neutralizing the catalyst and recovering epsilon-caprolactone by fractional distillation.

2. A process for the preparation of epsilon-caprolactone which comprises passing ketene gas through a mixture of tetrahydrofuran and boron fluoride at a temperature of about 0° C. adding sodium methylate to the reaction mixture and recovering the epsilon-caprolactone by distillation.

3. A process for the preparation of epsilon-caprolactone which comprises passing ketene into tetrahydrofuran in the presence of an acidic condensation catalyst at a temperature below 100° C.

4. A process for the preparation of a lactone which comprises passing ketene gas at a temperature below 100° C. through a mixture of a saturated aliphatic cyclic ether containing a single oxygen and from 2 to 4 carbons as members of the ring system.

WILLIAM E. GRIGSBY.

REFERENCES CITED

The following references are of record in the file of this patent:

UNITED STATES PATENTS

| Number | Name | Date |
| --- | --- | --- |
| 2,265,165 | Hopff et al. | Dec. 9, 1941 |
| 2,356,459 | Kung | Aug. 22, 1944 |